US009269291B2

(12) United States Patent
Byrd

(10) Patent No.: US 9,269,291 B2
(45) Date of Patent: Feb. 23, 2016

(54) FLEXIBLE LED PANEL SYSTEM

(76) Inventor: Jeremy Byrd, Memphis, TN (US)

( * ) Notice: Subject to any disclaimer, the term of this patent is extended or adjusted under 35 U.S.C. 154(b) by 0 days.

(21) Appl. No.: 14/234,090

(22) PCT Filed: Jul. 18, 2012

(86) PCT No.: PCT/US2012/047228
§ 371 (c)(1),
(2), (4) Date: May 5, 2014

(87) PCT Pub. No.: WO2013/012937
PCT Pub. Date: Jan. 24, 2013

(65) Prior Publication Data
US 2014/0253414 A1 Sep. 11, 2014

Related U.S. Application Data

(60) Provisional application No. 61/509,046, filed on Jul. 18, 2011.

(51) Int. Cl.
G09G 3/20 (2006.01)
G09F 9/33 (2006.01)
G06F 1/16 (2006.01)
G09G 3/32 (2006.01)

(52) U.S. Cl.
CPC ............ *G09G 3/2088* (2013.01); *G06F 1/1652* (2013.01); *G09F 9/33* (2013.01); *G09G 3/32* (2013.01); *G09G 2300/0426* (2013.01); *G09G 2320/02* (2013.01); *G09G 2340/14* (2013.01); *G09G 2354/00* (2013.01); *G09G 2360/06* (2013.01); *G09G 2380/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,900,850 A * | 5/1999 | Bailey et al. | | 345/55 |
| 6,362,801 B1 * | 3/2002 | Yuhara | | 345/82 |
| 6,677,918 B2 * | 1/2004 | Yuhara et al. | | 345/1.3 |
| 6,704,989 B1 * | 3/2004 | Lutz et al. | | 29/428 |
| 8,599,104 B2 * | 12/2013 | Gardner | | 345/1.3 |
| 8,599,108 B2 * | 12/2013 | Kline et al. | | 345/46 |
| 8,766,880 B2 * | 7/2014 | Kharrati et al. | | 345/46 |
| 8,922,458 B2 * | 12/2014 | Sefton et al. | | 345/1.3 |

FOREIGN PATENT DOCUMENTS

EP 2081172 A1 * 7/2009 ............... G09F 9/33

* cited by examiner

*Primary Examiner* — Van Chow
(74) *Attorney, Agent, or Firm* — Warner J. Delaune; Baker Donelson, et al.

(57) ABSTRACT

An improved LED display panel system (1) is provided, comprising a flexible curtain (2) having an array of surface mounted LED's (3) with a pixel density of approximately 2500 pixels per square meter. The panels (1) attach to one another in a vertical orientation employing upper or lower rigging bars (21, 22) which are flush with the last row of LED pixels (3) on each end. All data processing is accomplished inside the panels (1), and a single Ethercon cable connection (14A) is used for data input, and a single Ethercon cable connection (14B) is used for data output.

4 Claims, 4 Drawing Sheets

US 9,269,291 B2

FLEXIBLE LED PANEL SYSTEM

This nonprovisional application claims the benefit of priority to U.S. provisional application, Ser. No. 61/509,046, filed on Jul. 18, 2011.

TECHNICAL FIELD

The present invention relates to large light-emitting diode (LED) devices used to display images, and more particularly to such devices which are flexible and capable of being connected to one another to form a composite display system.

BACKGROUND OF THE INVENTION

Current light-emitting diode (LED) panels used in the entertainment industry provide users with a display for either static or moving images. While such panels are useful in many situations, they lack certain features regarding electrical connections, rigging, and portability which would make them more useable and desirable.

SUMMARY OF THE INVENTION

A light emitting diode (LED) display panel, comprising a flexible curtain having a plurality of LED's; a plurality of data boxes, wherein each of the data boxes is electronically connected to a predetermined array of LED's, and wherein each of the data boxes is also electronically connected to a predetermined number of other data boxes; a processor panel having electronic circuitry adapted to control the display of the LED's through the data boxes, wherein the processor panel further includes a single connector for permitting input and output data signals to and from a computer or another similar panel; a plurality of power distribution points connected to the processor panel and to predetermined data boxes; and an upper rigging bar and a lower rigging bar attached to the curtain, wherein each of the upper and lower rigging bars includes fastening hardware sufficient to allow connection of the panel to another similar panel.

In a preferred embodiment, the computer includes software programming sufficient to permit a user to control the LED's to display any desired image.

In another embodiment, the processor panel is enclosed within a box to consolidate connections made to the processor panel.

In still another embodiment, the upper and lower rigging bars are mounted flush with the last rows of LED pixels, such that a continuous display between connected panels is achieved.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
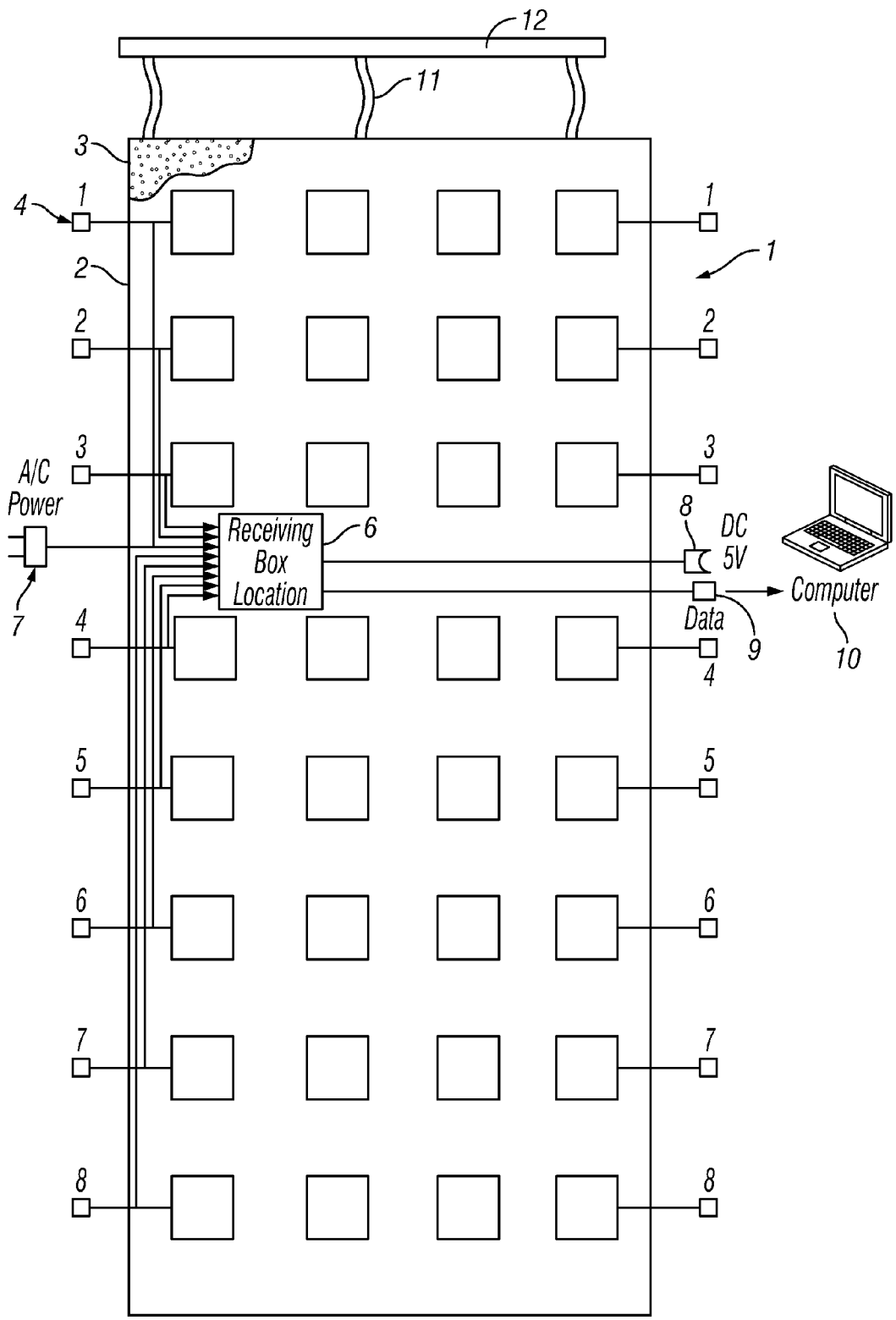
FIG. 1 shows a schematic view of the various electrical components of a prior art flexible LED display panel.

Turning now to the figures, FIG. 1 depicts a prior art flexible LED display panel 1. The panel 1 comprises a flexible fabric curtain 2 upon which are affixed numerous LED's 3 in a density of about 2500 pixels per square meter. Each side of the panel 1 includes a number of signal connectors 4, for a total of eight (8) connectors shown in FIG. 1. Data boxes 5 associated with various arrays of LED's 3 are shown arranged in a grid on the rear surface of the display panel 1. A receiving box 6 located among the data boxes 5 is used to route the many and various electrical connections required to operate the panel 1. The panel 1 receives AC power from an external source 7, typically 120V AC power, which is transformed to 5V DC power 8 that is connectable to one or more additional panels as needed. A data cable 9, such as Category 5 or 6 LAN cable, extends from the receiving box 6 having processing electronics for communication with a computer 10. For suspension of the flexible LED panel 1 from a structure, the panel 1 includes a number of straps 11 which terminate in a rigid bar 12 that can be secured by the supporting structure on site.

Thus, when the panel 1 is used in an assembly with other panels, a number of connections must be made. For example, the signal connectors 4 on each side must be connected to corresponding signal connectors on the adjacent panel. This process is quite time-consuming, and can lead to failure of the connectors with so many connections to be completed and disconnected on a repetitive basis. Given the urgency with which such panel assemblies need to be completed on a tight time frame, these inefficiencies can be expensive to all parties. Also, it is not possible to connect such panels vertically, because the strap 11 and bar 12 arrangement does not permit a flush mechanical connection that allows seamless positioning of LED pixels in the vertical direction.

Figure 2:
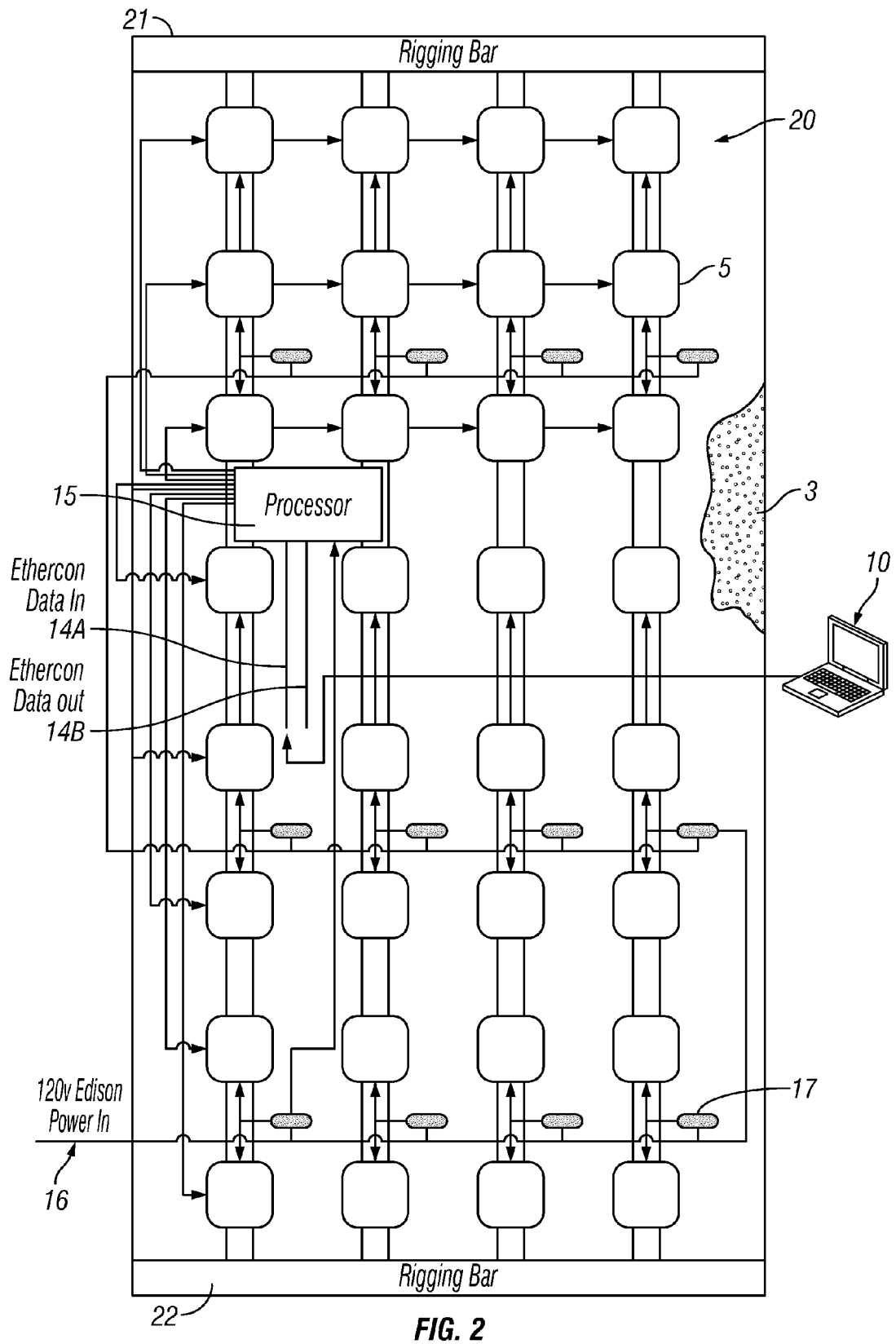
FIG. 2 shows a detailed schematic view of the present invention, depicting an improved panel over the design of FIG. 1.

In FIG. 2, it can be seen that all signal connections in the improved panel 20 have been consolidated into a single connector 14 having leads 14A, 14B for input and output, respectively, labeled as Ethercon In and Ethercon Out, which allows quick and easy connection between panels, rather than as many as eight connections. The connector 14 extends from a processor panel 15 having suitable processing electronics for control of the LED's 3, and the processor panel 15 is located on the rear of the panel 20 along with the data boxes 5 which are interconnected as shown in FIG. 2. Power 16 from an external source is provided at 120V AC to various distribution points 17 and transformed in 5V DC power for the data boxes 5 and the processor panel 15. Although the number of such power distribution points 17 may change to suit the particular design of the panel 20, twelve such power distribution points 17 are shown in a preferred configuration. As indicated in FIG. 2, the connector 14 is operatively in communication with a computer 10 which controls the LED display 3 via the processor panel 15. The computer 10 includes software programming that can be controlled by a user to direct the LED's to display any desired image. Importantly, when the connectors 14 of various panels are connected to one another using their respective leads 14A (input) and 14B (output), and a single connector lead 14A from one panel 20 is also connected to the computer 10, all of the connected panels 20 are thus controlled in unison, such that control data signals provided by the computer 10 result in a harmonized image across all panels 20 as if the multiple panels 20 were acting as a single display. While a wired connection is shown, it also possible to connect the input connector lead 14A to a wireless device (not shown), such that wireless communication of the control data from the computer 10 can also be achieved.

Likewise, the improved panel 20 includes an upper and lower rigging bar 21, 22. Each such rigging bar 21, 22 is located behind the LED array 3, and contain a number of holes with fastening hardware such that a rigid attachment to other vertically attached panels 20 is available either above or below the first panel 20. The rigging bars 21, 22 are mounted flush with the last upper and lower rows of LED pixels. When adjacent panels are connected in this fashion, the LED pixels between connected panels are essentially continuous, making for a more uniform and desirable image. Importantly, such panels 20 may be connected to one another both vertically and horizontally, allowing a large matrix of panels 20 to be assembled for virtually any size or shape to display the desired text or imagery as controlled by the computer 10.

Figure 3:
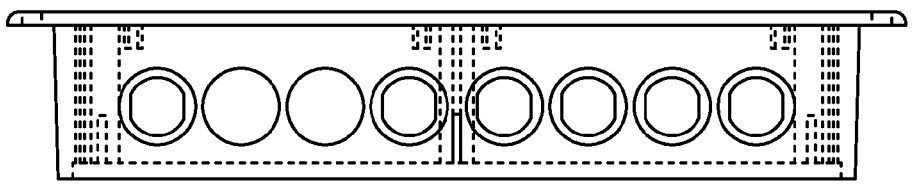
FIG. 3 shows a processor case for use with the invention of FIG. 2.
Figure 3:
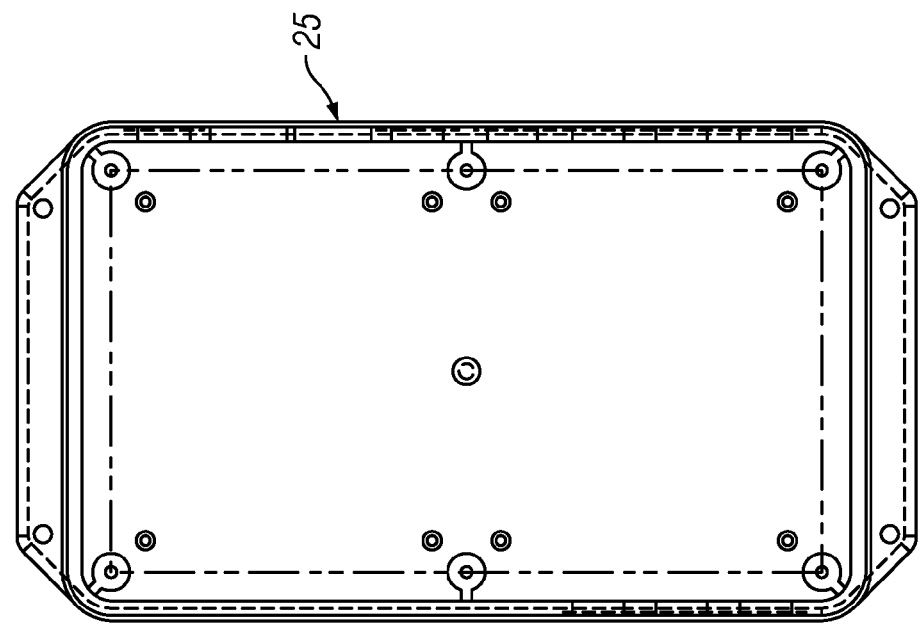
Figure 4:
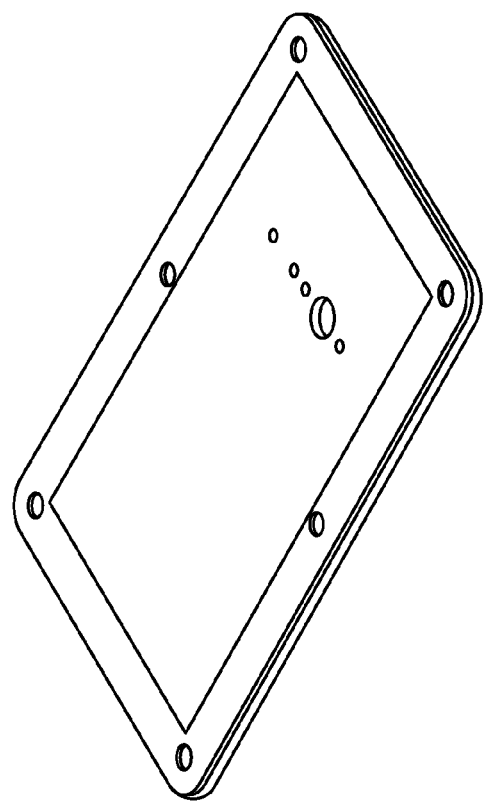
FIG. 4 shows a cover for the processor case of FIG. 3.
Figure 4:
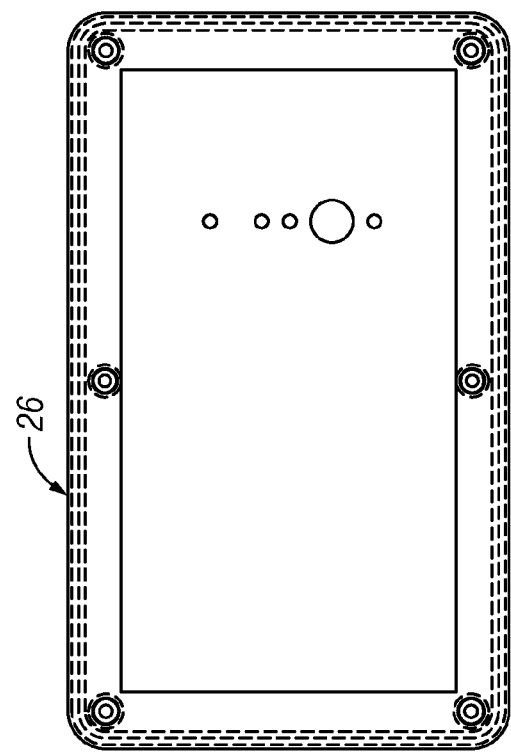

FIGS. 3 and 4 depict the processor panel 15 box 25 and cover 26, respectively, for use with the improved LED display panel 20. The box 25 conveniently consolidates the connections which enter the processor panel 15, and from which the single Ethercon connector leads 14A, 14B extend before communication with either an adjacent panel and/or the computer 10.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

What is claimed is:

1. A light emitting diode (LED) display panel, comprising:
   (a) a flexible curtain with a front surface, back surface, top edge, and bottom edge, the front surface having a plurality of LED's;
   (b) a plurality of data boxes on the back of the curtain, wherein each of the data boxes is electronically connected to a predetermined array of LED's, and wherein each of the data boxes is also electronically connected to a predetermined number of other data boxes;
   (c) a single processor panel on the back surface of the curtain having electronic circuitry adapted to control the display of the LED's through the data boxes in response to data signals from a computer, wherein the processor panel further includes a single connector for permitting input and output data signals to and from the computer or another similar panel;
   (d) a plurality of power distribution points connected to the processor panel and to predetermined data boxes; and
   (e) an upper rigging bar attached to the top of the curtain and a lower rigging bar attached to the bottom of the curtain, wherein each of the upper and lower rigging bars includes fastening hardware sufficient to allow vertical connection of the panel to another similar panel through connection of corresponding upper and lower rigging bars.

2. The panel of claim 1, wherein the computer includes software programming sufficient to permit a user to control the LED's to display any desired image.

3. The panel of claim 1, wherein the processor panel is enclosed within a box to consolidate connections made to the processor panel.

4. The panel of claim 1, where the upper and lower rigging bars are mounted flush with the last upper and lower rows of LED pixels, such that a continuous display between vertically connected panels is achieved.

\* \* \* \* \*